United States Patent [19]

Krenzler

[11] 3,894,305
[45] July 15, 1975

[54] BOAT WINDSHIELD
[75] Inventor: Leo M. Krenzler, Tacoma, Wash.
[73] Assignee: American Marine Industries, Tacoma, Wash.
[22] Filed: May 11, 1973
[21] Appl. No.: 359,478

[52] U.S. Cl. ............... 9/1 R; 296/84 A; 296/91
[51] Int. Cl. ............................................ B63b 17/00
[58] Field of Search .......... 296/91, 1 S, 84 R, 84 D, 296/84 A, 90; 9/1 R, 1 T; 244/121

[56] References Cited
UNITED STATES PATENTS

| | | | |
|---|---|---|---|
| 1,020,336 | 3/1912 | White | 296/91 |
| 1,059,017 | 4/1913 | White | 296/91 |
| 1,352,106 | 9/1920 | Vredenburgh | 244/121 |
| 1,850,439 | 3/1932 | Yeaton | 9/1 R |
| 2,102,123 | 12/1937 | Leveau | 9/1 R |
| 2,447,059 | 8/1948 | Eaton | 244/121 |
| 2,505,520 | 4/1950 | Bills | 9/1 R |
| 3,021,535 | 2/1962 | Dorst | 296/84 R |
| 3,195,549 | 7/1965 | Stevens | 9/1 R |

FOREIGN PATENTS OR APPLICATIONS 16,229  1/1915  United Kingdom.................. 296/91

*Primary Examiner*—Robert J. Spar
*Assistant Examiner*—Gary Auton
*Attorney, Agent, or Firm*—Eugene D. Farley

[57] ABSTRACT

A windshield for use on high speed boats comprises an upwardly and rearwardly inclined body portion merging into an upwardly angled top marginal portion functioning to deflect the high speed boat air stream upwardly and create above the windshield a wake carrying negligible air velocity.

1 Claim, 4 Drawing Figures

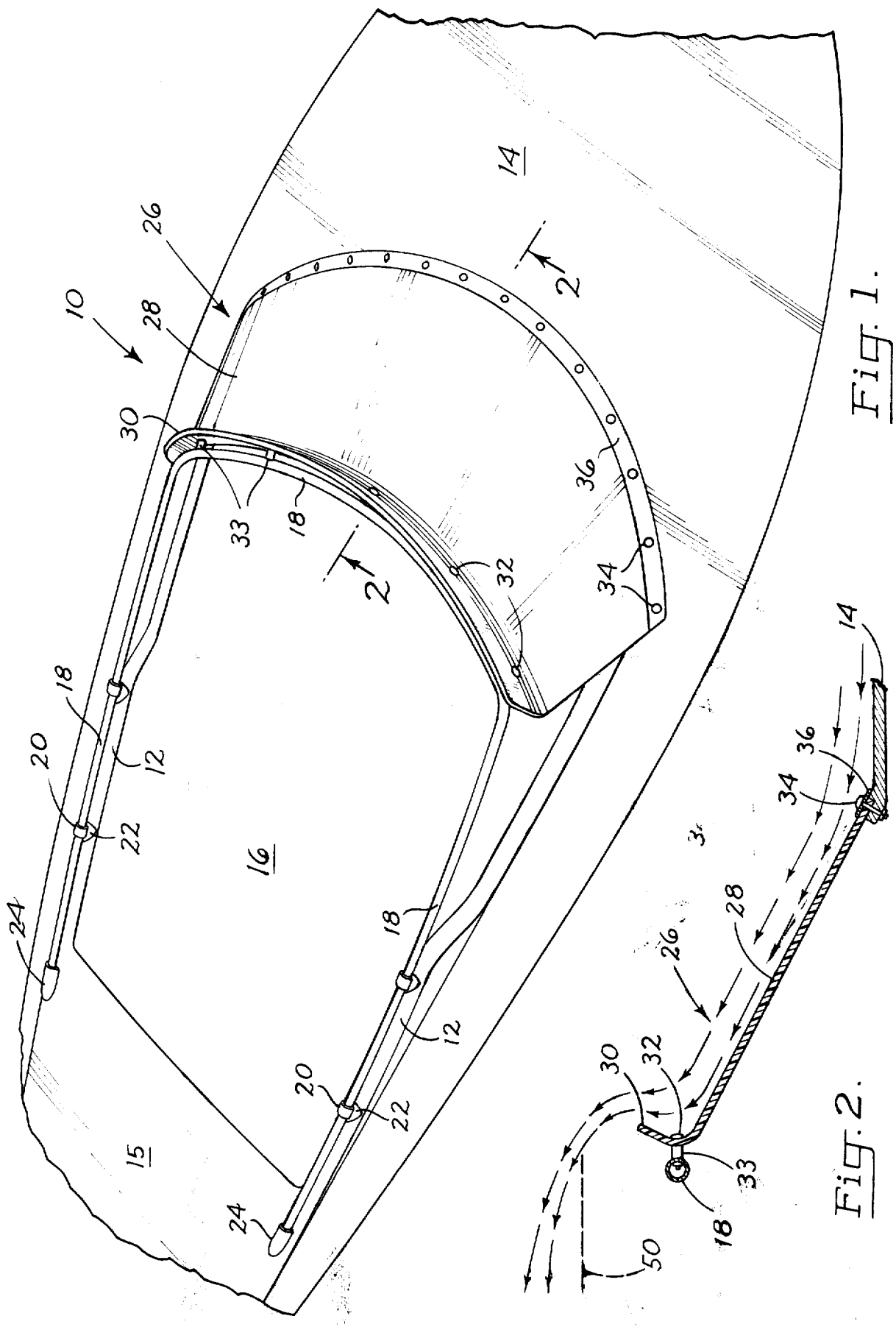

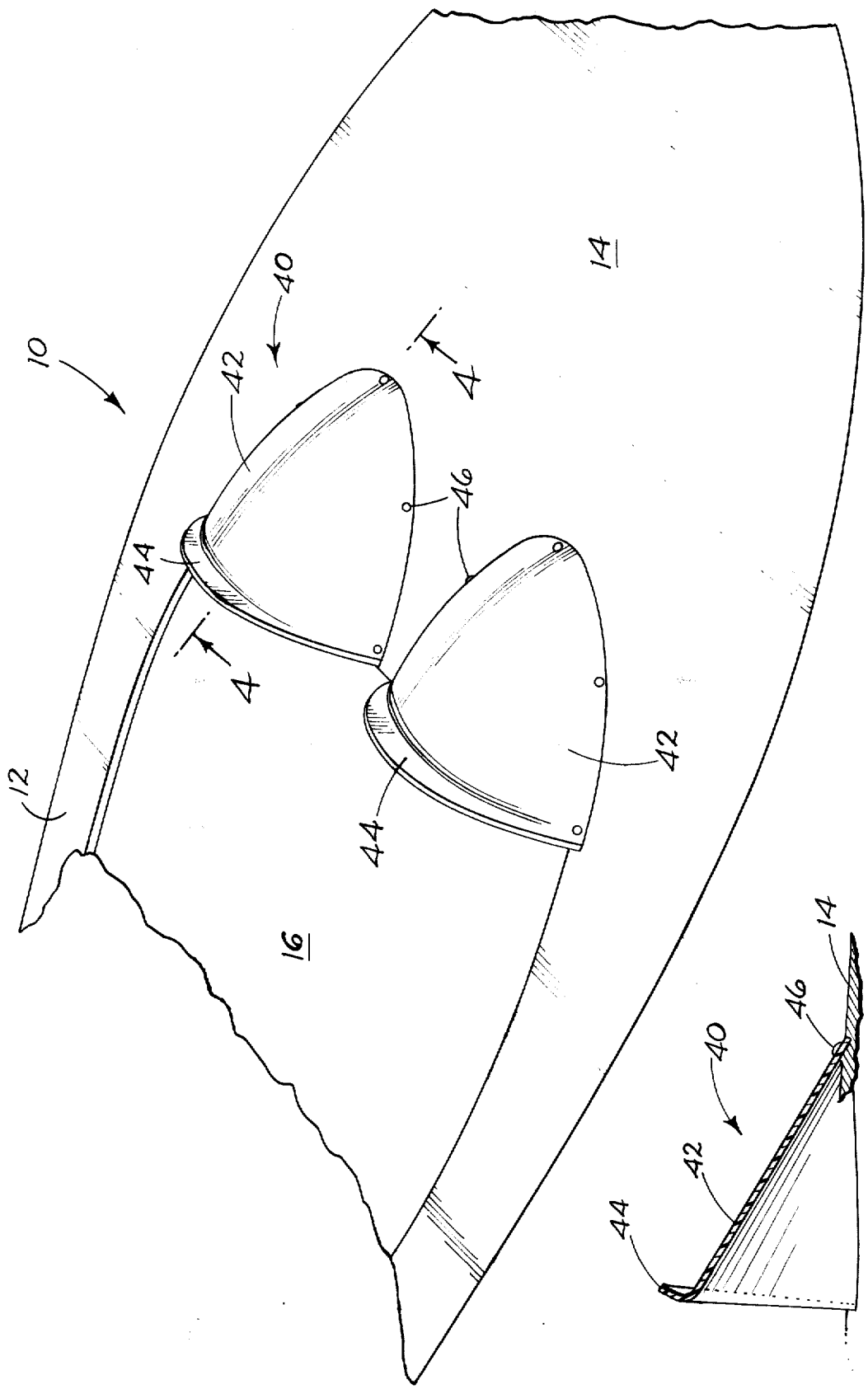

3,894,305

BOAT WINDSHIELD

This invention relates to windshields for high speed boats.

Of late years boat hull design and engine technology have developed inboard and outboard motor boats of the runabout class which are capable of speeds of the order of 60–80 miles per hour. This has created a problem in that at these speeds an air stream is developed of such velocity that it becomes intolerable or even dangerous to the operator of the boat and his passengers. This is particularly true in view of the fact that in the operation of such boats it often is necessary that the operator lift his head above the windshield in order to gain the visibility necessary for safe operation of the boat.

It accordingly is the general purpose of the present invention to provide a boat windshield adapted for use on high speed runabout boats which deflects upwardly the air stream developed at high speeds so as to provide a wake area behind the windshield in which the air stream has negligible velocity.

It is a further object of the present invention to provide a windshield for high speed boats which is attractive in appearance, blends into the streamlined design of the boat, is easily attached to the boat without damage to the boat structure, may be attached to the boat structure through watertight joints, and is adaptable for either single seat or double seat installations.

The foregoing and other objects of the invention are achieved by the provision of a boat windshield which, basically considered, comprises an upwardly and rearwardly inclined body portion, and a vertically angled upper margin arranged at an angle such as to deflect the air stream upwardly over the windshield, providing the desired wake in the area immediately behind.

Appropriate mounting means mount the lower margin of the windshield to the boat so that the windshield merges with the boat contour. A rail mounts the upwardly angled upper margin of the windshield to the boat. The windshield normally is horizontally arcuate and may be of a sufficient horizontal dimension to encompass either a single seated or multiple seated cockpit.

In the drawings:

FIG. 1 is a fragmentary, top, perspective view of a boat incorporating the hereindescribed windshield, designed for use with a boat having a double front seat.

FIG. 2 is a transverse sectional view of the windshield taken along lines 2—2 of FIG. 1.

FIG. 3 is a fragmentary, top, perspective view illustrating the hereindescribed windshield in an alternate design adapted for use with a boat having two single front seats and FIG. 4 is a transverse sectional view taken along line 4—4 of FIG. 3.

Considering first the embodiment of FIGS. 1 and 2 illustrating the hereindescribed windshield in conjunction with a boat in which the windshield extends uninterruptedly across the entire width of the boat cockpit, as required to protect a front seat accommodating two or three passengers:

In this form of the invention the hull of the boat, indicated generally at 10, is of the high speed, runabout class designed to be powered by either inboard or outboard motors. It may be fabricated from wood, steel, aluminum or, preferably, fiberglass and includes vertical side walls 12, a front deck 14, and a rear deck 15 all of which define a cockpit 16.

Mounted on side walls 12 is a rail 18 which serves the dual functions of a hand rail and a windshield support. The rail is generally U-shaped in outline. It extends along both side walls, and forwardly to the vicinity of the front deck from which it is spaced vertically by a predetermined distance. The rail may be fabricated from any suitable constructional material, such as stainless steel or chromed steel pipe.

The terminal portions of rail 18 are supported on side walls 12. In the illustrated form of the invention the support means comprise a plurality of longitudinally spaced sleeves 20 which are integral with base plates 22. The latter are screwed or bolted to side walls 12. The ends of the rail are received in sockets 24 which similarly are mounted on back deck 15.

A windshield 26 is positioned forwardly of the cockpit in the space between the cross piece of the U-shaped rail and the front deck. In the FIGS. 1 and 2 form of the invention the windshield is of the wrap-around, continuous type which encloses the entire forward portion of the cockpit. It is designed for use in boats in which the cockpit has a single front seat having a length sufficient to seat two or three persons.

Windshield 26 is fabricated from a suitable windshield material, preferably a clear plastic such as Plexiglas. It is formed in two vertical sections: a lower section 28 and an upper preferably integral section 30.

Both windshield sections are horizontally arcuate. The lower windshield section is the see-through section. It is upwardly and rearwardly sloping in lines which merge with the deck lines. The angle of slope lies at from 20°–70° with reference to the horizontal.

The upper windshield section 30 comprises a baffle section having for its function the generation of an upwardly blowing air jet which moves the air upwardly and rearwardly so that the boat operator may look over the top of the windshield without discomfort or danger. To this end, the plane of upper windshield section 30 lies at an angle of ± 25° to the vertical. Preferably it forms a slight reverse bend with respect to lower windshield section 28, as is particularly apparent in FIG. 2.

Suitable fastening means secure upper windshield section 30 to the central segment of U-shaped rail 18 and the lower margin of windshield section 28 to deck 14.

Accordingly, expansion bolts 32 penetrate registering openings in the upper part of the windshield and rail, and mount spacers 33 of appropriate length thus joining the windshield and rail.

Also, bolts 34 penetrate registering openings in the lower margin of the windshield and the inner margin of the deck. A sealing strip 36 of suitable material preferably is arranged between the bolts and the joint present between the windshield and the deck, and glued or bedded down in the usual manner.

The form of the invention illustrated in FIGS. 3 and 4 is similar with the exception that the twin windshields illustrated are designed for use on a boat the cockpit of which mounts a pair of single seats forwardly, just behind deck 14.

Each windshield, indicated generally at 40, includes an upwardly sloping body section or see-through section 42 which merges with an upwardly extending air baffle section 44. The angular relationship between these two sections is the same as that described above with reference to the single windshield form of the invention shown in FIGS. 1 and 2.

By reason of their small size, single windshields 42 have sufficient strength and rigidity so that their upper margins need not be supported. Their lower margins are bolted to deck 14 by means of bolts 46.

Both types of windshields function to deflect the air jet generated by the rapid movement of the boat upwardly for a substantial distance because of the upward-moving inertia or momentum of the air jet resulting from its up velocity. The resulting air curtain is curved rearwardly by the superatmospheric pressure developed in the region ahead of the windshield as well as by the subatmospheric pressure developed in the region behind the windshield. This is the wake. It carries a negligible air velocity and trails behind the windshield, which serves the function of a bluff body.

In the present instance, the wake is enlarged both laterally and upwardly by the forced up deflection of fore body flow caused by the upwardly angled windshield upper section.

This enlarged wake allows the boat operator and his passengers to elevate their heads a considerable distance above the upper edge of the windshield, for example to the plane of dashed line 50 of FIG. 2. In this wake region they experience only low speed air flows of under 10 miles per hour, even against boatgenerated head winds of 60 to 80 miles per hour. Their freedom from discomfort and hazard resulting from exposure to a high speed air jet thus is assured.

Having thus described my invention, I claim:

1. In combination with a boat having a hull with a front deck and upstanding side walls defining a cockpit, a windshield assembly comprising:

a. a substantially U-shaped rail disposed with its laterally spaced terminal portion overlying the side walls of the boat and having at least the forward sections of the terminal portions extending freely above the side walls of the boat, the transverse intermediate portion of said rail extending freely across the cockpit adjacent and above the level of the front deck, b. rail mounting means securing rearward sections of the spaced terminal portions of the rail to the side walls of the boat, c. a windshield positioned between the front deck and the transverse intermediate portion of the rail and having a lower see-through body portion secured and sealed at its lower forward margin to the front deck by securing and sealing means and extending upward and rearward therefrom at an angle of about 20°–70° from horizontal, and an upper see-through wind-deflecting portion integral with the body portion and extending upward therefrom angularly forward from vertical, d. windshield mounting means including bolt means securing said upper wind-deflecting portion to, and forwardly spaced apart from, said transverse intermediate portion of said rail, e. at least a portion of said forward section of each of said terminal portions being spaced above its side wall without any portion of said windshield therebetween, whereby said rail portion serves as a hand rail.

* * * * *

UNITED STATES PATENT OFFICE
CERTIFICATE OF CORRECTION

PATENT NO. : 3,894,305
DATED : July 15, 1975
INVENTOR(S) : Leo M. Krenzler

It is certified that error appears in the above-identified patent and that said Letters Patent are hereby corrected as shown below:

On the title page, under the heading [73] assignee:

Cancel "American Marine Industries, Tacoma, Wash."

and substitute

--By mesne assignments, Leo M. Krenzler, Tacoma, Wash.--

*Signed and Sealed this*

*eighteenth* Day of *May 1976*

[SEAL]

*Attest:*

RUTH C. MASON
*Attesting Officer*

C. MARSHALL DANN
*Commissioner of Patents and Trademarks*